US006631440B2

(12) United States Patent
Jenne et al.

(10) Patent No.: US 6,631,440 B2
(45) Date of Patent: Oct. 7, 2003

(54) METHOD AND APPARATUS FOR SCHEDULING MEMORY CALIBRATIONS BASED ON TRANSACTIONS

(75) Inventors: John E. Jenne, Houston, TX (US); Sompong P. Olarig, Cypress, TX (US)

(73) Assignee: Hewlett-Packard Development Company, Houston, TX (US)

( * ) Notice: Subject to any disclaimer, the term of this patent is extended or adjusted under 35 U.S.C. 154(b) by 178 days.

(21) Appl. No.: 09/726,739

(22) Filed: Nov. 30, 2000

(65) Prior Publication Data

US 2002/0065981 A1 May 30, 2002

(51) Int. Cl.[7] .............................................. G06F 13/00

(52) U.S. Cl. ...................................................... 711/105

(58) Field of Search ........................... 711/105; 710/112

(56) References Cited

U.S. PATENT DOCUMENTS 6,182,177 B1 * 1/2001 Harriman ..................... 710/112
6,304,932 B1 * 10/2001 Ziegler et al. ............... 710/112
6,321,233 B1 * 11/2001 Larson ......................... 707/201

OTHER PUBLICATIONS

*Direct Rambus™RIMM™Module Specification Version 1.0*, Rambus Inc., SL–0006–100 (32 p.), 2000.

*Rambus®RIMM™Module (with 128/144Mb RDRAMs)*, Preliminary Information, Document DL0084 Version 1.1 (12 p.).

*Direct RDRAM™256/288–Mbit (512Kx16/18x32s)*, Preliminary Information Document, DL0060, Version 1.01 (69 p.).

* cited by examiner

*Primary Examiner*—David L. Robertson

(57) ABSTRACT

A computer system includes a memory controller that controls and formats transactions with a high speed memory. The memory controller includes a read queue, a write queue, and various other queues in which memory transactions may be stored pending execution. The memory controller periodically executes calibration cycles, such as temperature calibration cycles to the memory to reduce memory errors. The temperature calibration cycles may include an idle state during which no read transactions can be executed. The memory controller includes arbitration logic that reduces latency by issuing read transaction first. Once reads have been issued, the arbitration logic executes any pending temperature cycles. During the idle period of the calibration cycle, the arbitration logic schedules write transactions, and transactions to memory from other queues and devices, including precharge transactions, row activate transactions, refresh cycles, and other calibration cycles.

15 Claims, 11 Drawing Sheets

TO FIG.9b

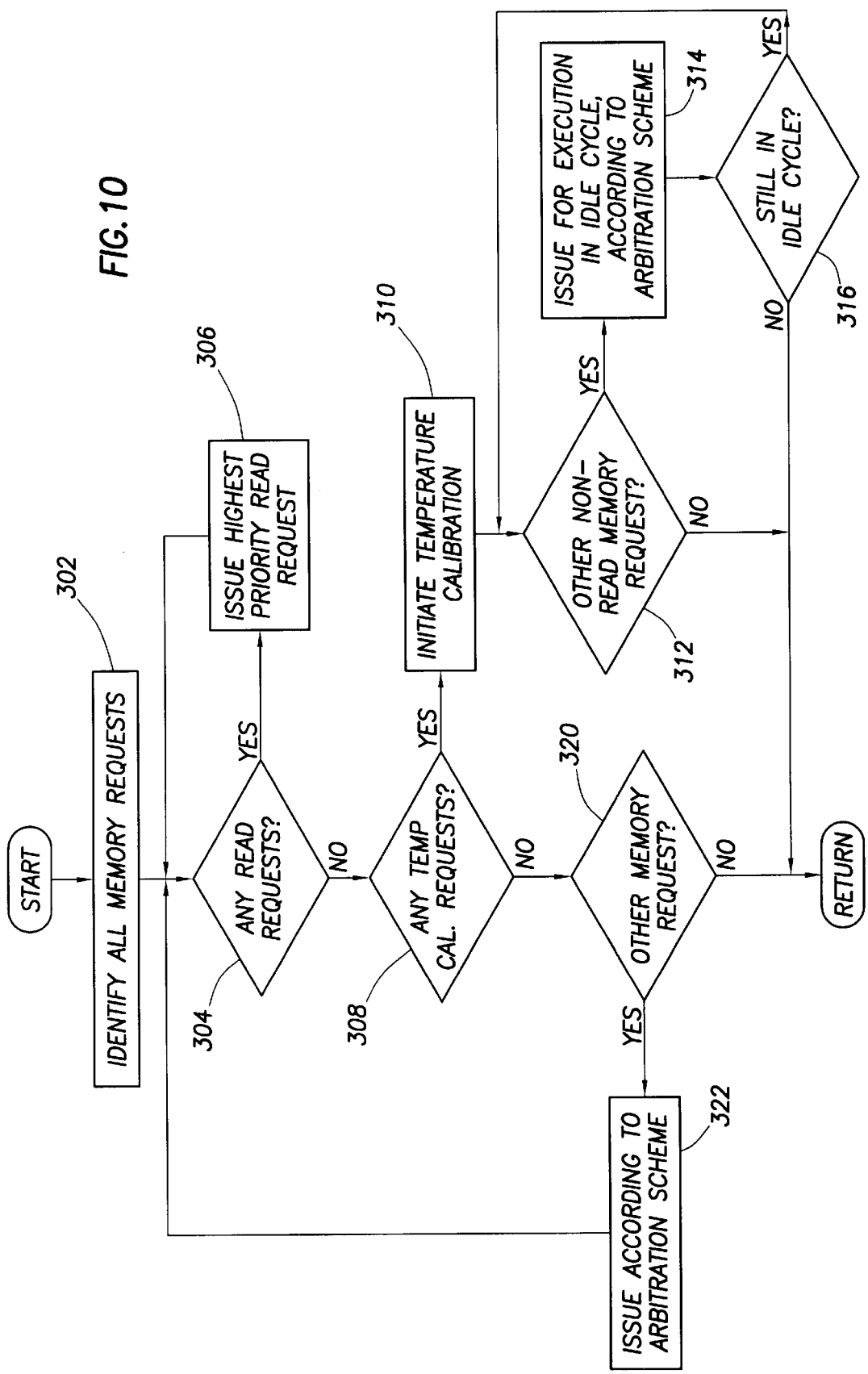

METHOD AND APPARATUS FOR SCHEDULING MEMORY CALIBRATIONS BASED ON TRANSACTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to memory systems that include high speed memory devices. More particularly, the present invention relates to memory systems, such as Direct Rambus Dynamic Random Access Memory (RDRAM), that require calibration cycles to insure proper operation. Still more particularly, the present invention relates to a memory system that makes intelligent decisions regarding the scheduling of calibration cycles based on queued memory operations to minimize latency.

2. Background of the Invention

Almost all computer systems include a processor and a system memory. The system memory functions as the working memory of the computer system, where data is stored that has been or will be used by the processor and other system components. The system memory typically includes banks of dynamic random access memory (DRAM) circuits. According to normal convention, a memory controller interfaces the processor to a memory bus that connects electrically to the DRAM circuits. The system memory provides storage for a large number of instructions and/or a large amount of data for use by the processor, providing faster access to the instructions and/or data than would otherwise be achieved if the processor were forced to retrieve data from a disk or drive. However, the access times of conventional RAMs are significantly longer than the clock cycle period of modem processors. To minimize the latency of the system, various high-speed memory devices have been introduced to the market. An example of such a high-speed memory device is the Direct RDRAM device developed by Rambus. See "RAMBUS Preliminary Information Direct RDRAM™", Document DL0060 Version 1.01; "Direct Rambus™ RIMM™ Module Specification Version 1.0", Document SL-0006-100; "Rambus RIMM™ Module (with 128/144 Mb RDRAMs)" Document DL00084, Version 1.1, which are incorporated by reference herein. As indicated in the Rambus specifications, the Direct RDRAM memory is capable of transferring 1.6 GB per second per DRAM device.

Each Direct RDRAM device typically includes 32 banks, with 512 rows per bank, although other size RDRAM devices may be available. Depending on the size of the RDRAM device, each row (or page) typically has either 1 kilobyte or 2 kilobytes of memory storage capability. The Direct RDRAM devices are arranged in channels, with each channel currently capable of supporting up to 16 Direct RDRAM devices. One or more Direct RDRAM devices may be packaged in Rambus In-line Memory Modules (RIMMs). Multiple channels may be provided in a computer system to expand the memory capabilities of the system.

While Direct RDRAM and similar memory devices are theoretically capable of operating at very high speeds, they exhibit certain severe operating constraints that can significantly degrade performance. To achieve the high operational speeds, the memory devices have very precise timing requirements, with very little margin or tolerance for deviation. Parameters for read transactions will be discussed briefly to illustrate some of the timing issues.

As shown in FIG. 1, the Direct RDRAM typically couples to a memory controller (which includes a Rambus ASIC Cell or "RC") via two clock signal lines, three Row signal lines, five Column signal lines, and two data busses. The clock lines include a Clock-to-Master (CTM) line, and a Clock-from-Master (CFM) line that are used to synchronize signals to the memory controller and from the memory controller, respectively. The Row signal lines and Column signal lines form part of a control and address bus (RQ bus) that typically includes eight lines. The Row signal lines (ROW2 . . . ROW0) are used primarily to control row accesses in the memory, while the Column signal lines (COL4 . . . COL0) are used primarily to control column accesses. The data busses include a DQA (DQA8 . . . DQ0) and a DQB data bus (DQB8 . . . DQ0), that couple to sense amps on opposite sides of the memory banks.

The three Row lines identify which of the 512 possible rows is addressed by presenting nine row bits (R8 . . . R0) in three subsequent half clock cycles ($2^9$=512), as shown in FIG. 2. The device row (DR) bits (DR3 . . . DR0) identify which of the 16 possible memory devices is targeted, while the five Bank row (BR) bits (BR4 . . . BR0) identify which of the 32 banks is targeted in that device. Similarly, and as shown in FIG. 3, the five Column lines identify which of the 64 possible columns is being addressed by presenting 5 column bits (C5 . . . C0) in two subsequent half cycles. The device column (DC) bits (DC4 . . . DC0) identify which of the memory devices is targeted, while the five Bank column (BC) bits (BC4 . . . BC0) identify which of the 32 banks is targeted.

Referring to FIG. 4A, a read transaction is performed on a Direct RDRAM device by asserting an Activate command in a ROWA (row activate) packet on the Row signal lines. The Activate command identifies the device, bank and row address of the targeted memory location. A time period $t_{RCD}$ later, a Read command is issued in a Column operation (COLC) packet on the Column signal lines. The Read command identifies the device, bank, and column address of the targeted memory location. Thus, the Activate command and Read command in conjunction identify the specific memory location being accessed, with the Activate command identifying the row, and the Read command identifying the column.

A time period $t_{CAC}$ after the Read command, a read data dualoct (16 bytes) is returned by the targeted memory device. The time period $t_{CAC}$ includes one to five cycles of round-trip propagation delay on the channel. According to current Rambus specifications, the $t_{CAC}$ period may be programmed to a range of values that vary from 7 $t_{CYCLE}$ to 12 $t_{CYCLE}$. The particular value selected for $t_{CAC}$ depends on the number of RDRAM devices on the channel and the RDRAM timing bin so that the round trip propagation delay is equalized for all memory devices. Thus, based on the programmed timing parameters, the memory controller expects that during read cycles, all memory devices will return read data within a specified number of clock cycles after the Read command is asserted. Failure to return data in accordance with these timing parameters will cause data corruption, and may result in failure of the memory system.

The above timing parameters for a read transaction is just one example of the critical nature of timing in a high speed memory device, where the delay of a few nanoseconds can result in data corruption. Unfortunately, high-speed memory devices such as Direct RDRAM have proven highly susceptible to temperature and other environmental conditions such as humidity. If such conditions change during operation, the round-trip propagation delay of the signals propagating between the memory controller and the memory devices will be affected. If the actual propagation delay varies from the programmed delay, the integrity of the memory system may be adversely impacted.

As shown in the example of FIG. 4B, a write transaction to an RDRAM memory device begins by activating a bank in a memory device with an Activate command in a ROW activate packet. A time period $t_{RCD}$-$t_{RTR}$ later, a Write command issues in a Column operation packet, with the $t_{RCD}$ interval measured to the end of the Column operation packet, with the first retire command. The Activate command includes the device, bank, and row address (abbreviated in FIG. 4B as a0), while the Write command includes device, bank, and column address (abbreviated as a1). A time period $t_{CWD}$ after the Write command, the write data dualoct D(a1) issues. A time period $t_{CC}$ after the first Column operation packet, a second Column operation packet issues on the Column wires, containing a Write a2 command. The a2 address has the same device and bank address as the a1 address, but a different column address. A time $t_{CWD}$ after the second Write command, a second write data dualoct D(a2) issues. A time $t_{RTR}$ after each Write command, a Column operation packet issues causing the write buffer to automatically retire. At the same time, a column mask packet may issue.

Subsequently, a Precharge command issues in a Row operation packet on the Row pins. This causes the addressed bank to precharge, so that a different row in that bank, or an adjacent bank, may be activated. The address (a3) includes the same device and bank address as the a0, a1, and a2 addresses. The Precharge command must occur a time period $t_{RAS}$ or more after the original Activate command. In addition, the Precharge command must occur a time period $t_{RTP}$ or more after the last Column operation packet that causes an automatic retire. A subsequent Activate command (b0) to the same device and bank, but different row, must occur a time $t_{RC}$ or more after the first Activate command, and a time $t_{RP}$ or more after the Precharge command to ensure that the bank and the associated sense amps are precharged. Thus, because transaction b targets the same device and bank, but a different row, it must not start until the prior transaction a completes. Transactions to other banks or other devices may be issued during transaction a.

In an attempt to resolve operational problems with high speed memory devices such as RDRAM, the memory controller may be designed or programmed to perform certain calibration cycles on a periodic basis. Thus, for example, memory controllers used with Direct RDRAM memory device perform current and temperature calibrations on a periodic basis in accordance with Rambus specifications. For example, a current calibration cycle is performed to every DRDAM device once every $t_{CCTRL}$ interval to maintain the $I_{OL}$ current output within its proper range. As shown in the example of FIG. 5, four Column extended operation (COLX) packets are asserted by the memory controller with a Calibrate (CAL) command. These Calibrate commands cause the RDRAM to drive four calibration packets Q(a0) a time period $t_{CAC}$ after the CAL command on the DQA4 . . . 3 and DQB4 . . . 3 wires. In addition, the TSQ bit of the INIT register is driven on the DQA5 wire during the same interval as the calibration packets. The TSQ bit indicates when a temperature trip point has been exceeded, as measured by temperature sensing circuitry. The last COLX packet from the memory controller includes a SAM command, concatenated with the last CAL command, that causes the RDRAM to sample the last calibration packet and adjust its $I_{OL}$ current value.

The Calibrate command must be sent on an individual basis to each RDRAM device so that calibration packets from other devices do not interfere with the calibration. Consequently, a current control transaction must be transmitted every $t_{CCTRL}$/N period, where N represents the number of RDRAMs resident on the channel. After each current calibration transaction, the device field Da of the address a0 in the Calibrate command is incremented.

Temperature calibration similarly is conducted on a periodic basis. As shown in FIG. 6, according to the Rambus specifications, the temperature calibration sequence is broadcast once every $t_{TEMP}$ interval to all the RDRAMs on the channel. The TCEN and TCAL are row opcode field commands in a ROW operation packet. These commands cause the slew rate of the output drivers to adjust for temperature drift. During the quiet interval, $t_{TCQUIET}$, the devices being calibrated cannot be read, but can receive write transactions.

Thus, while Direct RDRAM is designed to calibrate memory devices based on current and temperature calibrations, these calibrations are performed on a rigid schedule to meet certain minimum timing requirements. In addition, these calibration cycles require long periods of idle time, during which no read cycle is permitted to the memory devices being calibrated. This idle time can add significant latency to any queued read cycles. Currently, the idle period for a Direct RDRAM temperature calibration cycle (the period defined as $t_{TCQUIET}$) is a minimum of 350 ns for a 800 MHz memory device (which is 140 clock cycles).

It would be desirable if a system could be developed that would provide greater flexibility in modifying timing parameters of memory components based on the existing workload scheduled for the memory devices. It would also be advantageous if the memory controller was capable of making intelligent decisions regarding memory calibrations to minimize latency of memory read operations to improve system performance. Despite the apparent advantages such a system would offer, to date no such system is available.

BRIEF SUMMARY OF THE INVENTION

The present invention solves the deficiencies of the prior art by implementing an intelligent memory controller that monitors the pending workload of the memory devices and which schedules calibration cycles around memory read cycles to optimize system performance. According to the preferred embodiment, the memory controller schedules temperature calibration cycles during periods where no read transactions are awaiting execution in a read queue to minimize the latency of read operations. Moreover, to further enhance system performance, the memory controller preferably schedules write operations to execute during idle periods that exist in the temperature calibration cycle. Other operations, such as precharge, refresh or current calibrations may also be scheduled during the temperature calibration idle periods. Thus, the memory controller optimizes system performance by issuing read operations before calibration cycles, and by executing other operations during available time periods in the temperature calibration cycle that would otherwise remain idle.

According to an exemplary embodiment of the present invention, the memory system includes a memory controller that includes a plurality of queues in which transactions are stored prior to execution. Preferably, the memory controller includes a precharge queue, a row address (RAS) queue, a read queue, a write queue, a refresh queue, a current calibration queue, and a temperature calibration queue. An arbitration logic device couples to the various queues to determine what operations have been queued and are awaiting execution. According to the preferred embodiment, the arbitration logic gives all operations posted in the read queue priority. Thus, queued read transaction are executed prior to other normal operations, including any operation pending in the temperature calibration queue. When the read queue is empty, the arbitration logic determines if a temperature calibration operation is pending, and if so, issues the temperature calibration cycle. Prior to, or during the idle period in the temperature calibration cycle, the arbitration issues any pending write operations, or any other pending operation including precharge cycles, refresh cycles, and/or current calibration cycles.

According to the preferred embodiment, the memory controller includes a timer that causes a temperature calibration operation to be posted in a temperature calibration queue. The memory controller also has other queues, including a read queue and a write queue, and arbitration logic that prioritizes operations pending in the queues. The arbitration logic preferably prioritizes read operations by executing all read operations pending in the read queue first. Next, the arbitration logic schedules a temperature calibration operation, if a temperature calibration operation has been placed in the calibration queue. During the execution of the temperature calibration operation, certain idle periods exist during which the arbitration logic preferably issues other pending operations such as any queued write operations, or any other queued operations that can be executed during the temperature calibration idle period, such as precharge cycles, refresh cycles or current calibration cycles.

BRIEF DESCRIPTION OF THE DRAWINGS

For a detailed description of the preferred embodiments of the invention, reference will now be made to the accompanying drawings in which:

FIG. 10 is a flow chart depicting an exemplary operation of the memory controller of FIG. 8.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
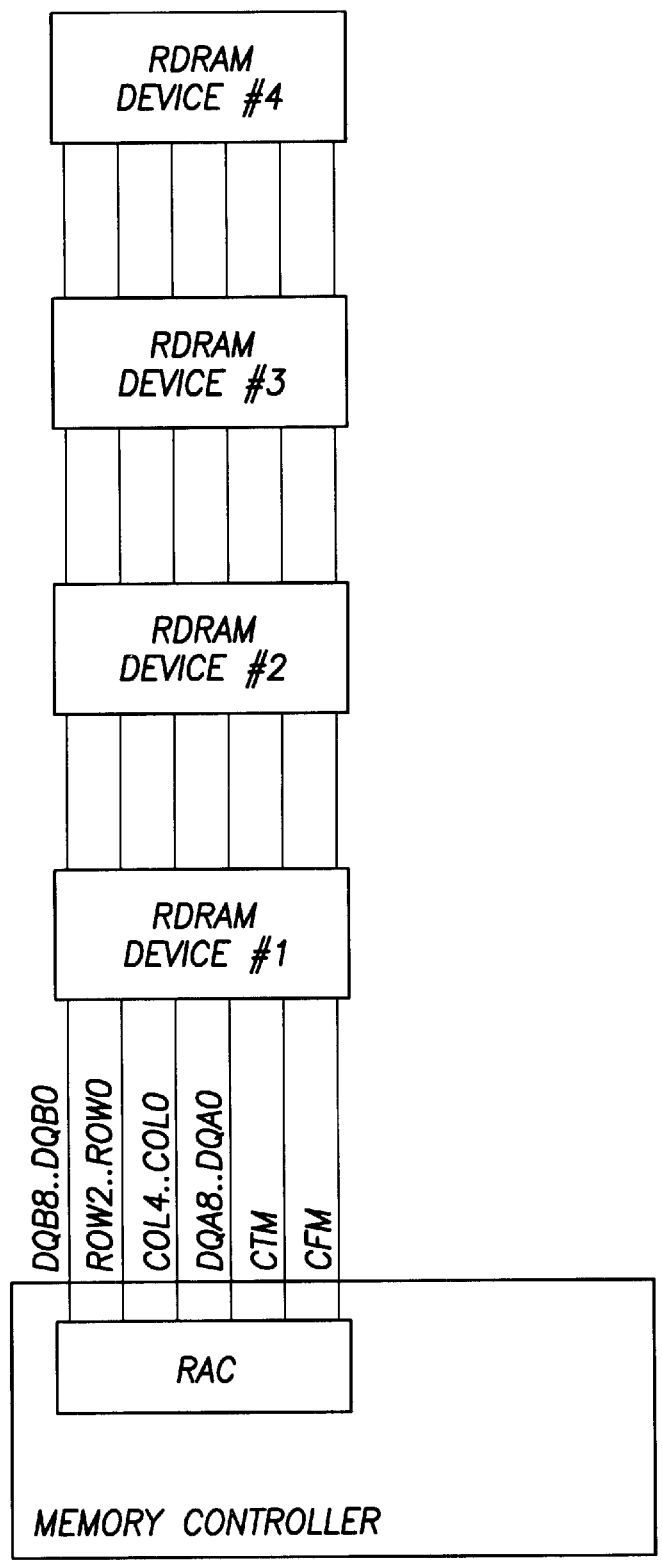
FIG. 1 is a prior art drawing showing the manner in which RDRAM devices couple to a memory controller.
Figure 2:
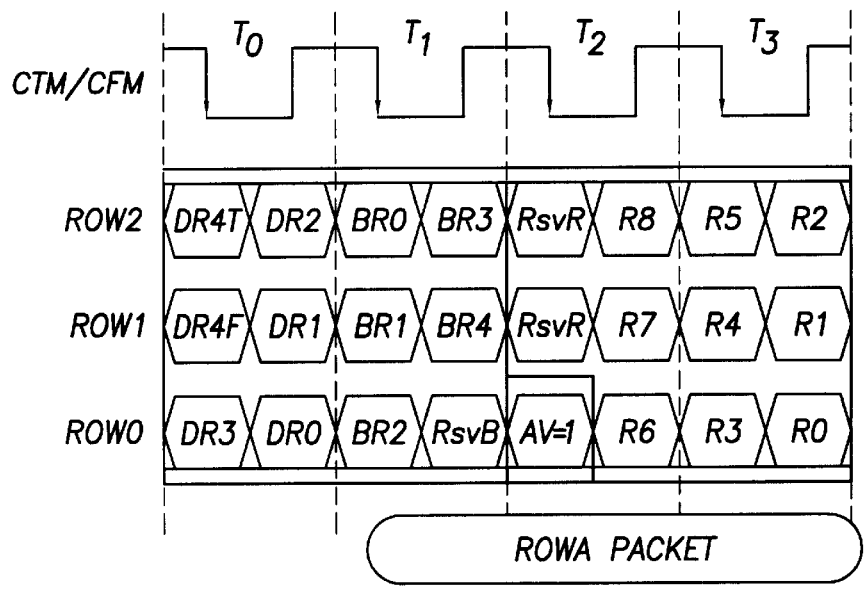
FIG. 2 is a prior art drawing showing a row activate packet for RDRAM devices.
Figure 3:
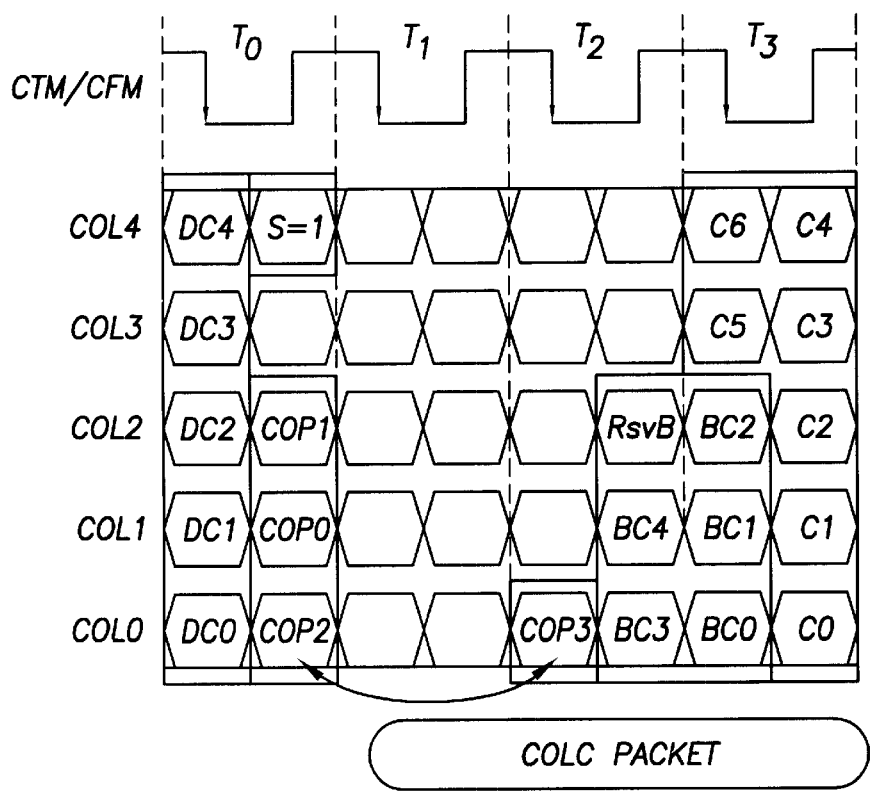
FIG. 3 is a prior art drawing showing a column operation packet for RDRAM devices.
Figure 4A:
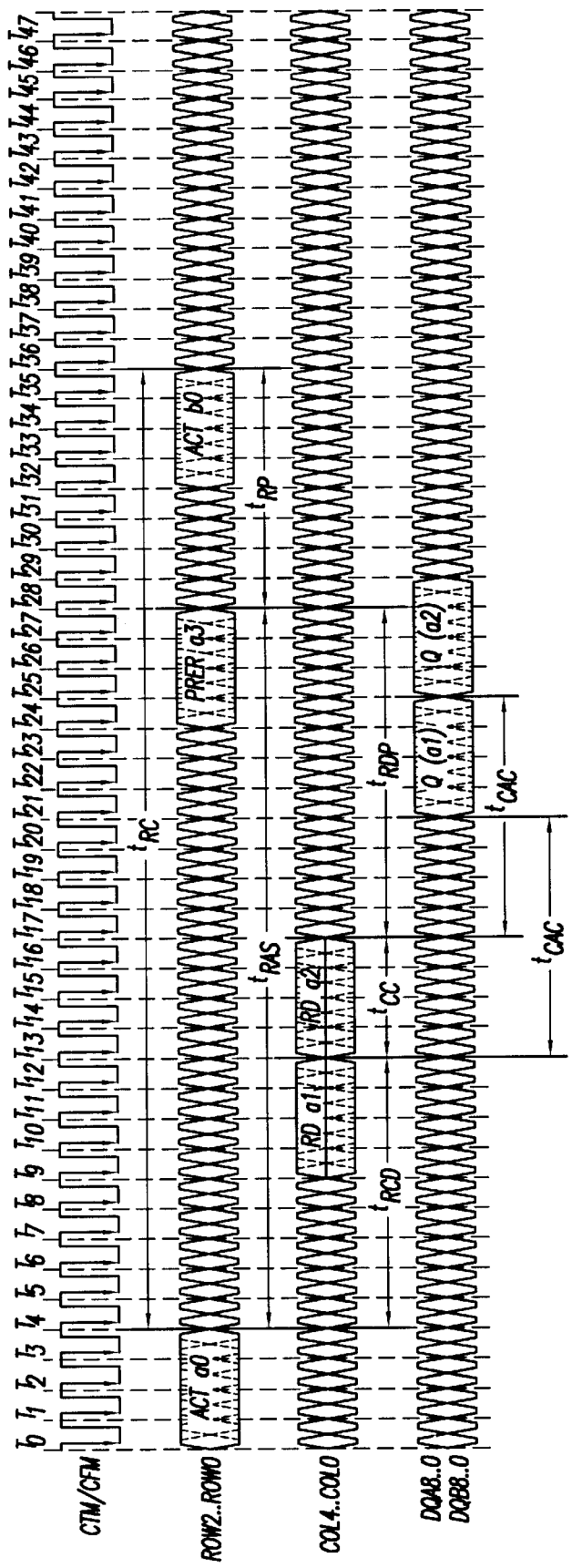
FIG. 4A is a prior art drawing showing a typical timing diagram for a read operation to an RDRAM device.
Figure 4B:
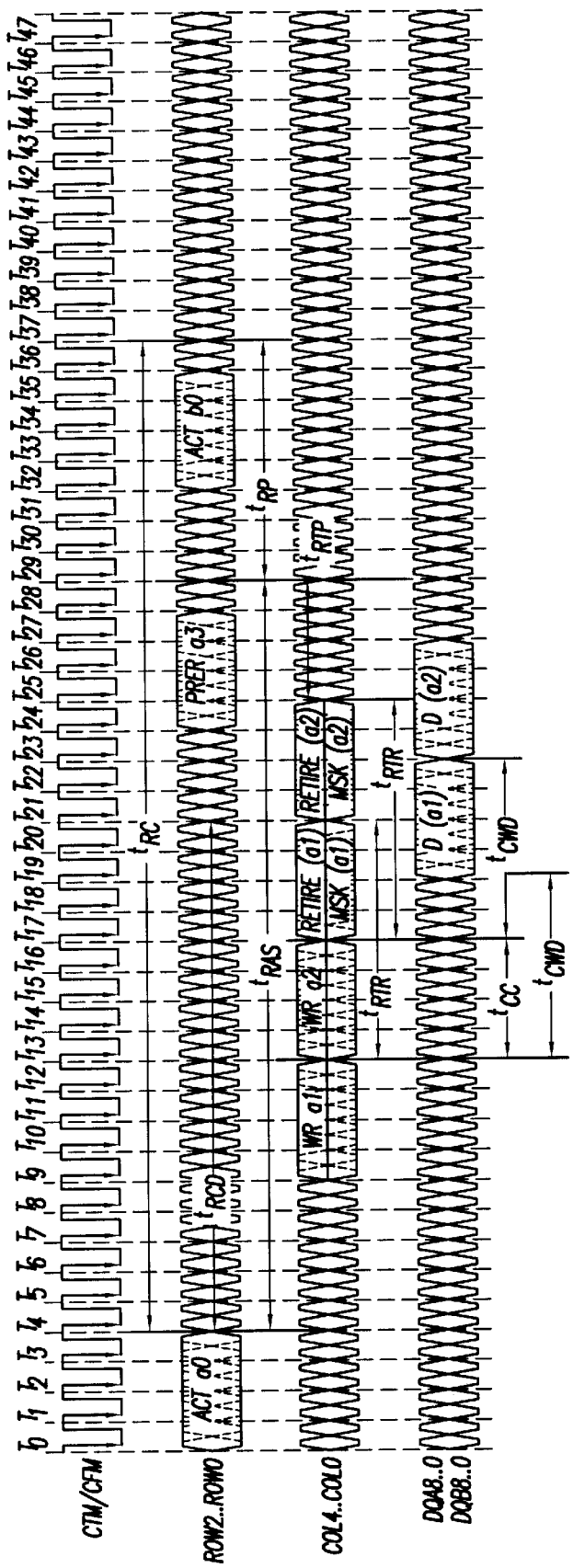
FIG. 4B is a prior art drawing showing a typical timing diagram for a write operation to an RDRAM device.
Figure 5:
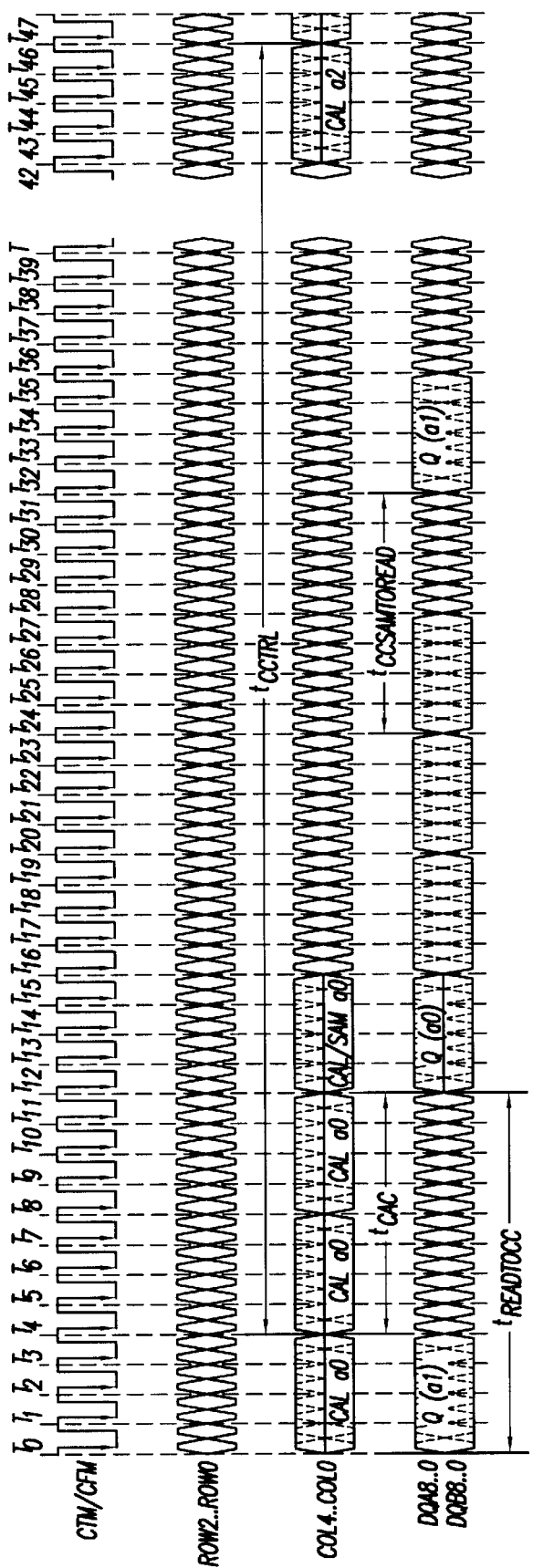
FIG. 5 is a prior art drawing showing a typical current calibration cycles to an RDRAM device.
Figure 6:
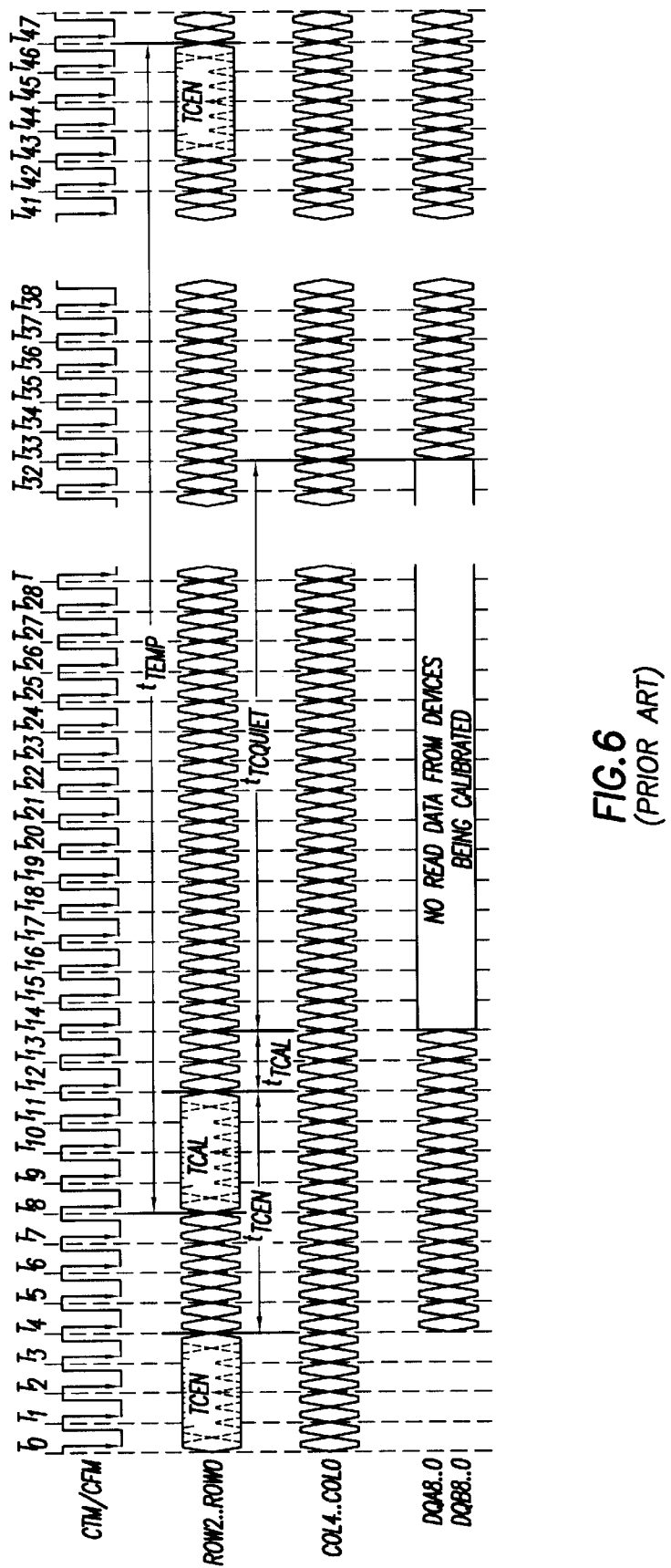
FIG. 6 is a prior art drawing showing a typical temperature calibration cycles to an RDRAM device.
Figure 7:
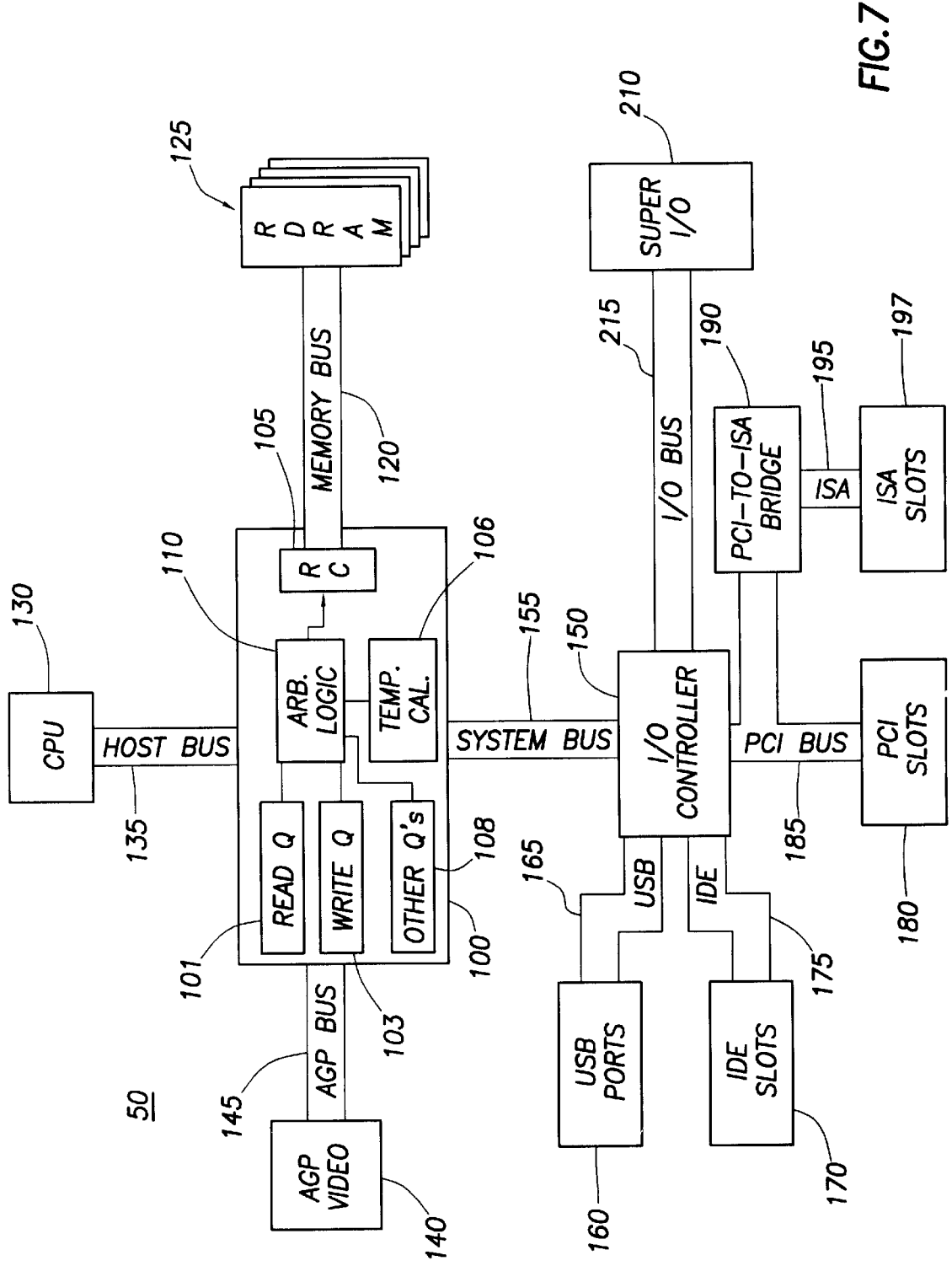
FIG. 7 is a block diagram illustrating an exemplary computer system that includes a single channel memory system constructed in accordance with the preferred embodiment.

Referring initially to FIG. 7, a computer system 50 may comprise a personal computer, a web computer, a server, or a workstation, without limitation. Although not shown, the computer system 50 preferably couples via a suitable network connection to a local area network (LAN). As shown in FIG. 7, the computer system 50 preferably implements a standard computer architecture, including a CPU (or processor) 130, system memory 125, a memory controller 100, AGP video controller 140, and I/O controller 150. The processor 130 preferably couples to the memory controller 100 through host bus 135. It should be understood that other embodiments of the invention may include more than one processor or CPU coupled to the host bus. The processor may comprise any suitable microprocessor such as the Pentium II®, Pentium III®, or Celeron® processor by Intel®, the Athlon® processor by AMD, the Alpha processor by Compaq, or other microprocessors from these or other manufacturers that may be used or configured for use in a computer system. The system memory 125 preferably comprises one or more memory devices such as any suitable type of random access memory. System memory may comprise, for example, synchronous dynamic random access memory (SDRAM), or other memory designs suitable for use in a computer. According to the preferred embodiment, the system memory 125 comprises Rambus Direct dynamic random access memory (RDRAM) devices. The capacity of the RDRAM devices is arbitrary, and thus can be of any suitable size. The RDRAM memory devices are arranged in channels that couple separately to the memory controller 100 (only one such channel is shown in FIG. 7 for simplicity). Within each channel, a plurality of RDRAM memory devices may be provided. Four RDRAM devices are shown in FIG. 7 for purposes of illustration. Current Rambus specifications support 16 RDRAM memory devices per channel, but the present invention may be implemented without limitation as to memory size or capacity. One or more RDRAM memory devices may be implemented as Rambus In-line Memory Modules (RIMMs). The memory controller 100 preferably couples to the RDRAM memory devices through a conventional Rambus memory bus. A separate memory bus 120 typically is provided for each memory channel.

The memory controller 100 permits the processor 130 and other devices in computer system 50 to read data from or write data to system memory 125. As shown in FIG. 7, the memory controller 100 preferably includes an interface to an advanced graphics port (AGP) to support a graphics video controller 140 or other graphics device. According to normal convention, an AGP bus 145 couples the video controller 140 to the memory controller 100. As one skilled in the art will understand, graphics processors or accelerators implementing other protocols also may be used instead of an AGP controller. Typically, a monitor (not shown) couples to the video controller 140.

The memory controller 100 also preferably functions as an interface to a system or peripheral bus 155. In the preferred embodiment, the system bus 155 comprises a high-speed data bus to the I/O controller hub 150. The I/O controller hub 150 bridges the system bus to a variety of peripheral busses, including a USB bus 165, an IDE bus 175, and a PCI bus 185. Coupled to each of these busses are ports or slots that enable compatible devices to be connected to the computer system. Thus, for example, a PCI peripheral device, such as a PCI-compatible network interface card (or NIC) may be inserted into one of the PCI slots 180, for coupling to the I/O controller 150 via the PCI bus 185. In similar fashion, USB devices may be connected to the computer system through one or more USB ports 160, and IDE devices may be connected to the system by inserting the IDE device in any available IDE slot 170. To support legacy ISA devices, a PCI-to-ISA bridge 190 preferably couples to the PCI bus 185. A conventional ISA bus 195 couples ISA slots 197 to the PCI-to-ISA bridge 190. Other devices, such as a modem, audio amplifier, or LAN connection may connect directly to the I/O controller hub 150, or may couple via the conventional peripheral busses.

As shown in FIG. 7, the I/O controller hub 150 preferably couples to a Super I/O controller 210 through an I/O bus 215. The Super I/O device 210 preferably includes conventional ports for coupling to floppy disk drives, a keyboard, and a mouse. Thus, the Super I/O device 210 preferably includes conventional keyboard and mouse controllers for converting user inputs to a traditional format for relaying to the CPU 130. The Super I/O 210 also preferably includes standard parallel and serial ports to permit other peripheral devices to be added to the computer system 50, as desired by the user.

Although not shown in FIG. 7, other environmental or temperature sensors may be positioned adjacent the system memory. Such a sensor may couple to the memory controller 100, to provide the memory controller a continuous indication of environmental conditions at, or in the vicinity of, the memory devices. According to the preferred embodiment of FIG. 7, the memory controller 100 preferably includes a Rambus Controller (abbreviated as RC) 105, which orchestrates the transfer of address, data, and control signals between the memory controller 100 and the RDRAM memory devices 125. Thus, RC 105 generates the necessary row (ROW), column (COL), clock (CTM, CFM), and data (DQA, DQB) signals to activate and precharge the memory devices, thereby enabling read, write and other transactions to be performed in the memory devices.

The memory controller 100 also preferably includes various queues in which pending instructions or operations are stored prior to execution. As shown in FIG. 7, the memory controller may include a read queue 101 in which all pending read transactions are stored prior to execution. Similarly, the memory controller 100 may also include a write queue 103 that stores pending write transactions prior to execution. The read and write queue may be of any desired size. In an exemplary embodiment, both the read queue 101 and write queue 103 are capable of storing up to eight transactions. In addition to a read and write queue, the memory controller 100 preferably include a temperature calibration queue 106, in which a temperature calibration instruction is stored prior to execution. In addition to these queues, a number of other queues, as shown at item 108, may also be provided for storing pending instructions prior to execution on the memory bus 120. The memory controller 100 also preferably includes arbitration logic 110, which couples to each of the queues to determine which queues have instructions and/or transaction that are awaiting execution. The arbitration logic 110 also preferably couples to the Rambus controller 105 to indicate to the Rambus controller which instruction to execute. The memory controller 100 also includes other conventional logic (not shown) for interfacing the CPU 130, video controller 140, I/O controller, and memory 125, as will be understood by one skilled in the art. Before describing the memory controller 100 in further detail, the RDRAM devices will now be discussed to provide additional background.

Figure 9A:
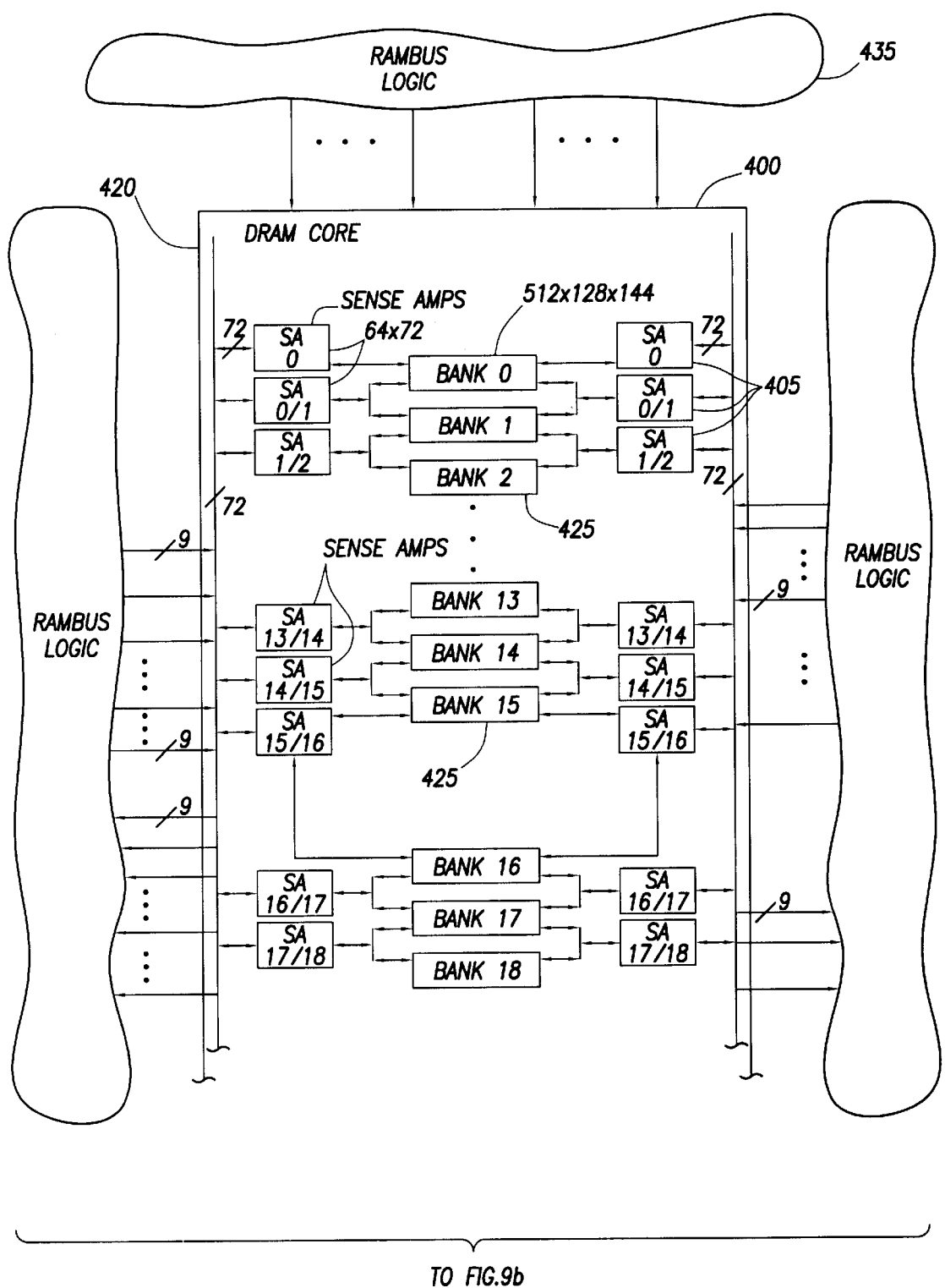
FIG. 9 is a block diagram illustrating a Rambus DRAM core that forms part of the system memory in the preferred embodiment of FIG. 7.
Figure 9B:
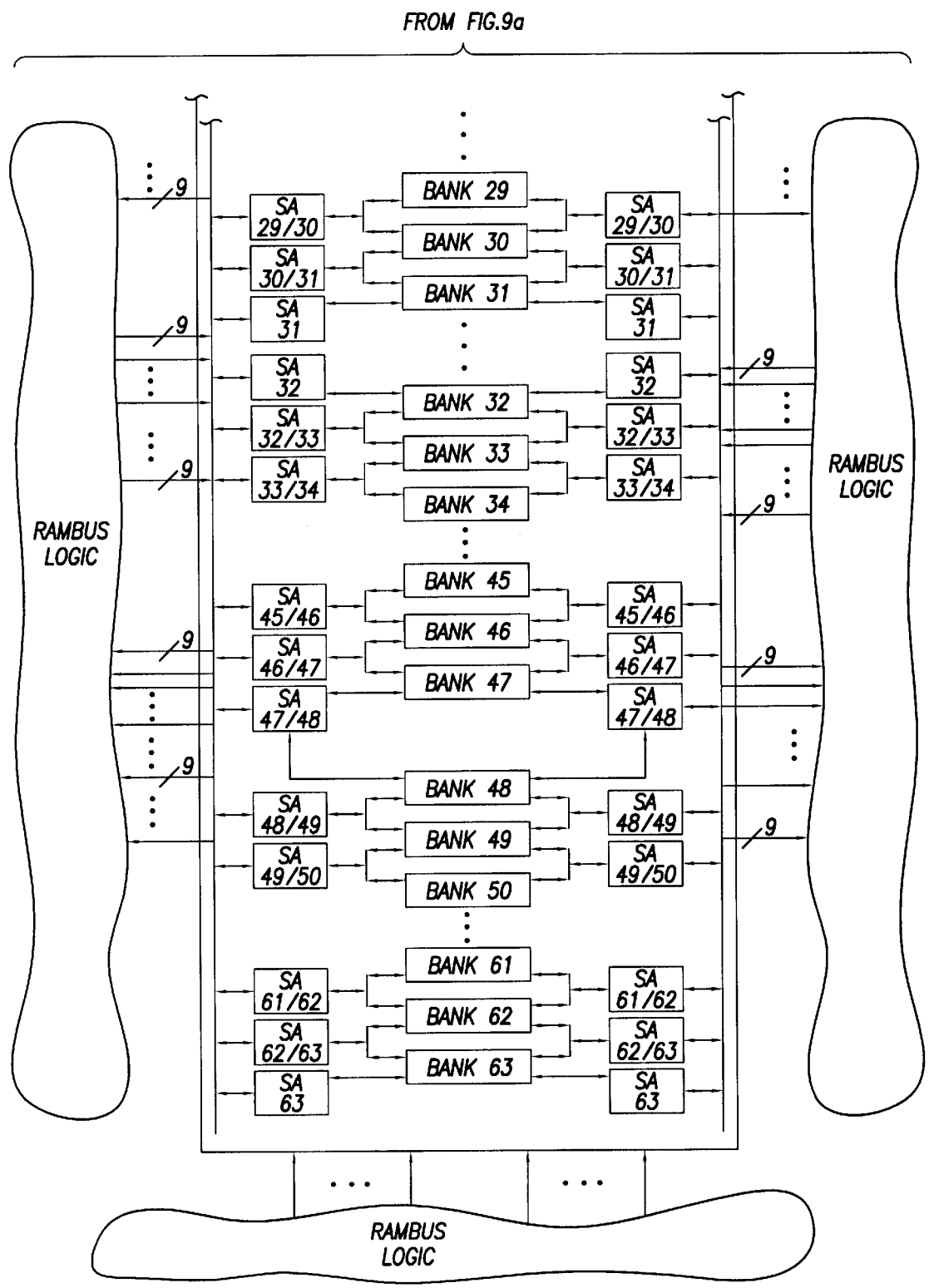

Referring now to FIG. 9, a RAMbuS™ DRAM ("RDRAM") device 400 includes a DRAM core 420 containing memory banks 425 and sense amplifiers 405 and RAMbuS™ interface logic 435 that permits an external control device to preferably access the DRAM core 420 at up to 1.6 gigabytes/second. Any number of memory banks 425 may potentially be included in each RDRAM device. Sixty-four memory banks are shown in FIG. 9; however, a DRAM core 420 with 16, 32, 128, or other multiplier of 16 may be used. Each DRAM core 420 preferably contains 64 sense amplifiers 405, with each sense amplifier 405 shared between two adjacent banks 425 of the DRAM core 420 (except for sense amplifiers 0, 31, 32, and 63 that are not shared). The sense amplifiers 405 are connected through data paths DQA and DQB that read and write data to RAMbuS™ interface logic 435 that is then relayed to the memory controller 100. Control lines Precharge, RowA, and ColCRd/ColCWr, respectively, causes a memory bank to close a page, activate a page, or read/write a page to the memory bank.

In the preferred embodiment, the 64 Mbyte DRAM core 420 of the RDRAM 400 is divided into 64 one-Mbyte banks 425, each organized as 512 rows, with each row containing 128 columns and each column containing sixteen bytes (also known as a dualoct). Thus, each row contains 2 Kilobytes of data (128*16=2 Kilobytes). A column is the smallest unit of data that can be addressed in a memory bank. The RDRAM 400 preferably contains 64 sense amplifier buffers 405. Each sense amplifier buffer 405 is capable of storing 1024 bytes (512 for DQA and 512 for DQB) and in the preferred embodiment can hold one-half of one row of a RDRAM memory bank 425. The number of bytes that can be stored in two sense amplifiers 405 is called the page size of the RDRAM device 400 because each memory bank 425 has access to two sense amplifiers 405. Thus, the page size for the preferred embodiment is 2048 bytes (2 Kilobytes). In other embodiments of the invention, a page can be 1 Kilobyte or 4 Kilobytes based on the storage capacity of the sense amplifier. A sense amplifier may hold any of the 512 half-rows of an associated memory bank. However, as mentioned above, each sense amplifier is shared between two adjacent banks of the RDRAM. This introduces the restriction that adjacent banks 425 in the preferred embodiment may not be simultaneously accessed.

In operation, a Control line Precharge signal couples to the DRAM core 420 and transmits a Precharge command that, along with the RDRAM device and memory bank address, causes the selected memory bank 425 to release its two associated sense amplifiers 405. This permits a different row in that memory bank to be activated, or permits adjacent memory banks to be activated. A Row Activate control line couples to the DRAM core 420 and transmits an Activate command that, along with the RDRAM device, memory bank and row address, causes the selected row of the selected bank to be loaded into its associated sense amplifiers 405 (two 512 byte sense amplifiers for DQA and two 512 byte sense amplifiers for DQB). The ColCRd command is issued to a RDRAM device, memory bank, and column address to transfer a column of data (16 bytes) from one of the two sense amplifiers 405 shared by the memory bank 425 through the DQA/DQB 450 data paths to the RAMbus™ interface logic 435. The data is then output to the memory controller 100. A ColCWr command transfers a column of data from the memory controller 100 through the RAMbus™ interface logic and DQA/DQB data paths to one of the two sense amplifiers 405 for the RDRAM device, memory bank, and column address.

Figure 8:
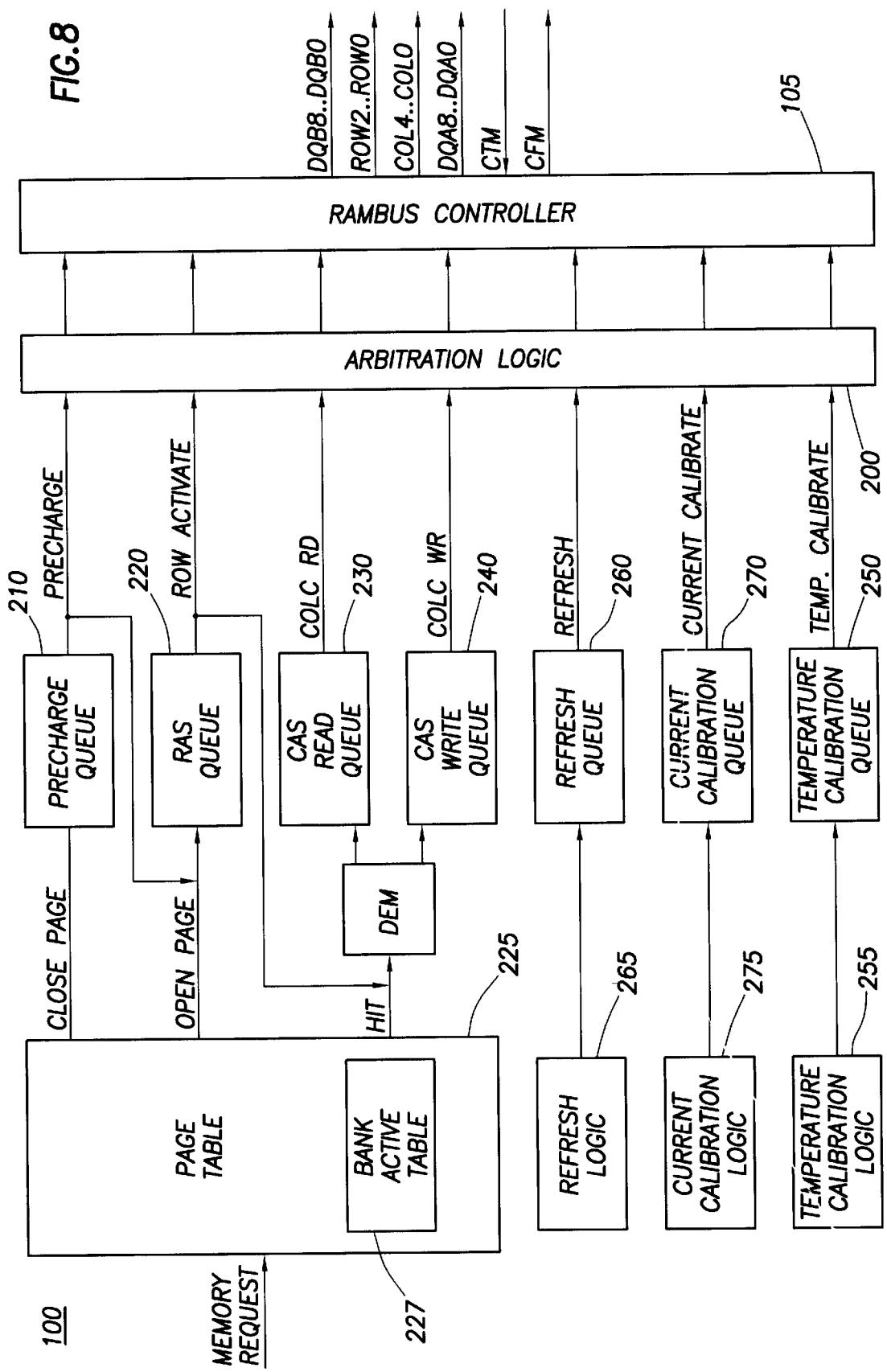
FIG. 8 is a block diagram illustrating the memory controller of FIG. 7 in accordance with the preferred embodiment.

Referring now to FIG. 8, the memory controller 100 preferably includes a page table 225 associated with a precharge queue 210, a RAS queue, and a CAS read queue 230 and CAS write queue 240, refresh logic 265 associated with a refresh queue 260, current calibration logic 275 associated with a current calibration queue 270, a temperature calibration logic 255 associated with a temperature calibration queue 250, and arbitration logic 200 that couples one of the queues to the Rambus controller 105.

The page table 225 controls the manner in which a standard memory request accesses the RDRAM devices. In particular, the page table 225 determines which pages of memory are opened (that is, which row of a memory bank is contained in an associated sense amp), so that the targeted memory location can be accessed correctly. Thus, for example, if a pending memory request targets a page of memory that is already contained in a sense amp, the memory transaction can proceed without first precharging and activating that page of memory. If conversely, a different page of memory from the same memory bank is contained in the sense amp, then executing a transaction to a different page of memory in the same bank requires that the sense amp be precharged to close the page of memory stored in the sense amp, and then the sense amp must be activated to load the appropriate memory page. The page table 225 keeps track of which pages of memory are open so that memory transactions can be completed efficiently.

Preferably, the page table 225 allows a maximum of 1024 pages to be in the activated open page state in the memory system. A read or write instruction from the memory controller 100 can result in the activation of a page in the appropriate sense amplifier 405 in a RDRAM device 400, memory bank 425 and row. When the new page is activated, a unique identifier, preferably the row address of the page, is stored in the page table structure. In addition, a bank active table 227 includes a bit for each memory bank to identify which banks have been loaded in a sense amp.

The bank active table 227 preferably comprises a 32×64 bit table indicating the current banks having activated pages. The bank active table 227, because of the shared sense amplifier architecture, is never permitted to have two sequential ones (i.e., 1-1-0 or 0-1-1) since this would indicate that adjacent banks sharing a sense amplifier both had active pages.

The page table 225 is organized so that each memory bank of each RDRAM device is assigned a row in the 1024 rows of the page table. In the preferred embodiment, each RIMM contains a maximum of 32 RDRAM device chips and, because of the shared sense amplifier architecture of the RDRAM chip, a maximum of 32 memory banks in each RDRAM device can be active at any given time. Thus, the 32 active banks of each RDRAM device can each be assigned a row in the 1024 entry page table 225 (32 RDRAM devices * 32 maximum banks per RDRAM device active at any given time=1024). Each RDRAM device and memory bank combination maps to a unique row of the page table 225 for this direct-mapped arrangement.

A memory request accesses the page table 225 to determine the status of the page of memory being accessed. New requests are looked-up in the page table by addressing the page table 225 with a device and bank tag. The page row address stored in the page table 225 is compared to the row address of the transaction being looked-up in the page table. If there is a match, and the appropriate bit in the bank active table 227 is set while adjacent bits are cleared, then a page hit has occurred. If the page row address stored in the page table 225 does not match the row address of the transaction being looked-up and the appropriate bit in the bank active table 227 is set while adjacent bits are cleared, then the currently open page must be closed before opening the new requested page. Finally, if neither of the appropriate bits in the bank active table 227 is set for the row of the page table 225, indicating that no page from either bank is open in the sense amplifier buffers, then the new page requested can be activated immediately without requiring a prior page closure. For the preferred embodiment of shared sense amplifier type RDRAM devices discussed above, neighboring memory banks must have their bank active bit clear in the bank activate table 227 to allow activation of the requested page without requiring prior closure of another page residing in the shared sense amplifier.

FIG. 8 includes a page table 225 containing row addresses of newly activated pages, a four entry precharge queue 210, a four entry RAS ("Row-address-select") queue 220, an eight entry CAS ("Column-address-select") Read queue 230 and an eight entry CAS ("Column-address-select") Write queue 240. The page table 225 generates control signals, including a Close Page signal, an Open Page signal, and a Page Hit signal, which place the targeted address into the appropriate queue. The precharge queue 210 and RAS queue 220 preferably generate Precharge and Row Activate signals, respectively, to the appropriate RDRAM device, bank, row, and column. The CAS read queue 230 and CAS write queue 240 identify the device, bank and column being accessed in the opened page.

According to the preferred embodiment, queues 210, 220, 230 and 240 implement a three-tiered structure that hold page miss close transactions, page miss open transactions, and page hit transactions. As discussed above, the page table 225 contains page row addresses of newly activated pages. In one scenario, when a new memory request for a page conflicts with an in-flight memory transaction (i.e., memory transaction in the process of closing, opening or accessing a page in the same sense amplifiers accessed by the new memory request), then the new memory request is rejected by logic in the page table 225, and must be retried at a later time. The reject mechanism works by comparing a new memory request to all memory requests pending in the precharge queue 210, RAS queue 220, CAS Read queue 230 and CAS Write queue 240 that are implemented as Content-Addressable-Memories ("CAM"). If a match is detected, then the request is rejected to be retried at a later time. A match occurs if the memory request accesses the same sense amplifiers 425 as any pending requests in the precharge 210, RAS 220, CAS Read 230 or CAS Write 240 queues, that is the memory requests are to pages in the same memory bank or adjacent memory banks.

A Close Page control signal is issued by the Page table 225 if the requested page is not currently active, and a different page has already been activated into the targeted sense amplifier. As mentioned previously, the preferred embodiment supports memory devices that employ sense amplifier sharing between adjacent banks. Thus, a memory lookup will result in a Close Page signal if either the memory bank active bit of the targeted bank or adjacent banks is set. An Open Page control signal is issued by the Page table 225 if the requested page is not currently active, but the sense amplifier is empty and immediately ready for a new page. For the preferred embodiment of shared sense amplifier memory devices, a sense amplifier is considered empty if the sense amplifier is not in use by the targeted bank or the adjacent banks. A Page Hit is issued by the Page table 225 if the requested memory page is already activated in the appropriate sense amplifiers and is ready for immediate access to or from the sense amplifiers.

If the memory lookup result is a Page hit read or Page hit write, Close Page or Open Page that does not conflict with any in-flight transactions, the request is allowed to proceed, by loading the memory request into the Precharge 210, RAS 220, CAS Read 230, or CAS Write 240 queues. For each of the four possible memory lookup results discussed above, a corresponding queue to service the request is available. Page hit reads and page hit writes are differentiated by the memory controller and loaded into the appropriate CAS Read 230 or CAS Write 240 queue. A Close Page request generates three transactions in the memory system: (1) closing the old memory page in RDRAM (Precharge queue 210 transaction), (2) opening the desired memory page in RDRAM (RAS queue 220 transaction), and (3) accessing the data from the sense amplifiers in RDRAM (CAS Read queue 230 or CAS Write 240 queue transaction). An Open Page request results in (2) opening the desired memory page in RDRAM (RAS queue 220 transaction) and (3) accessing the data from the sense amplifiers in RDRAM (CAS Read queue 230 or CAS Write queue 240 transaction). A Page Hit request requires only (3) accessing the data from the sense amplifiers in RDRAM (CAS Read queue 230 or CAS Write queue 240 transaction).

To complete the page opening process, as transactions are issued from the Precharge queue 210, they are automatically placed into the RAS queue 220. Similarly, as entries are issued from the RAS queue 220, they are automatically placed into the CAS Read queue 230 or CAS Write queue 240 that results in the access of the data in the sense amplifier. The CAS Read queue 230 and CAS Write queue 240 that store page hits preferably are the deepest (8 entries each) because they must hold all memory requests which have traveled through the Precharge 210 and RAS queues 220, as well as directly-enqueued page hits.

Maintaining separate CAS Read and CAS Write queues allows streaming of groups of read requests and groups of write requests to RDRAM devices resulting in many fewer lost clock cycles due to bus turnaround. By discerning between read requests and write requests at the enqueue stage, the present invention also permits read transaction to be executed prior to other pending transactions, according to the preferred embodiment.

Referring still to FIG. 8, the memory controller 100 also preferably includes refresh logic 265, which according to normal convention, periodically issues a refresh command to particular memory addresses or sections of memory. According to the preferred embodiment, the refresh commands are stored in a refresh queue 260 prior to execution. The refresh commands are issued periodically to each section of memory to insure that data is not lost in DRAM.

The memory controller also preferably includes current calibration logic 275 that periodically issues a current calibration cycle to particular sections of memory to determine if the output current of the DRAM devices is within an acceptable range. According to the preferred embodiment, the current calibration cycles are stored in a queue 270 pending execution. Similarly, temperature calibration logic 255 also is provided in the memory controller 100 to periodically issue temperature calibration requests. These temperature calibration requests preferably are stored in a temperature calibration queue 250. Although each of logic devices 265, 275, 255 are depicted with separate queues in FIG. 8, they also may implemented with queues that are integrated with the logic. As yet another alternative, these logic devices may be implemented without queues, by simply sending an appropriate request to the Rambus controller, which then determines the appropriate address for the refresh or calibration cycle.

According to the preferred embodiment of FIG. 8, arbitration logic 200 preferably couples to each of queues 210, 220, 230, 240, 250, 260 and 270 to determine which of these queues have pending transaction that are waiting to be executed. According to the preferred embodiment, the arbitration logic 200 selects or schedules a queue to proceed with executing a transaction. This monitoring and selection by the arbitration logic may be implemented in any of a variety of ways, as will be apparent to one skilled in the art. Thus, the queues may transmit a request signal to the arbitration logic, and the arbitration logic may then provide a grant signal back. Alternatively, the arbitration may snoop the output lines of the queues, and may provide a select signal to a multiplexer that passes the selected queue output for execution. Various other implementations are possible, and thus may be used in practicing the present invention. Whichever queue is selected by the arbitration logic 200, the highest priority transaction in that queue is then passed to the Rambus controller 105, which formats the request into an appropriate RDRAM protocol for transmitting to the targeted RDRAM location.

While certain aspects of the present invention have been described in relation to FIG. 8, it should be understood that the system shown in FIG. 8 is the preferred embodiment, not the only embodiment. Various designs may be used to implement the principles of the present invention. Thus, any system that includes a high priority queue and at least one lower priority queue, and which runs calibration cycles, may benefit from the principles of the present invention. Thus, the specific cascading queue design of FIG. 8 is not a requirement of the present invention.

Referring now to FIG. 10, the preferred operation of the arbitration logic 200 will now be described. As shown in step 302, the arbitration logic identifies which queues have transactions that are waiting to execute. In step 304, the arbitration logic determines if any waiting transactions comprise read requests. If so, the arbitration awards priority to the read request in step 306, thus enabling the read request to execute. According to the preferred embodiment, certain exceptions to this priority may exist, if necessary to prevent loss of data or other system error. After the highest priority read request is issued in step 306, the process returns to step 304. If no read requests are found in step 304, the arbitration logic determines if any temperature calibration requests are awaiting execution in step 308. In the preferred embodiment, the temperature calibration logic periodically loads the temperature calibration queue with a temperature calibration operation. Preferably, the temperature calibration logic does this when a first minimum time period is met since the previous calibration cycle to that same location. The minimum time period prevents requests from accumulating prematurely, but preferably comprises a period less than the maximum time for a calibration cycle to permit the operation to be queued while read requests are cleared.

If a calibration operation is detected by the arbitration logic in step 308, the arbitration logic passes the temperature calibration operation to the Rambus controller to begin execution, as shown in step 310. While the temperature calibration is issuing, the arbitration logic in step 312 identifies any other non-read transaction that may be queued in any of queues 210, 220, 260 or 270. If other non-read transactions are queued, the arbitration logic schedules the highest priority transaction to execute during the idle period in the temperature calibration cycle, as shown in step 314, according to any other desired arbitration scheme (which may require certain transactions to issue before others). If that particular transaction cannot complete during the idle period, the arbitration logic may then select the next highest priority transaction to execute. Once that transaction executes, the arbitration logic determines if sufficient time remains in the idle period to execute other queued transactions, as shown in step 316. If, in response to step 316, the arbitration logic determines that there are no other queued non-read transactions, or if insufficient idle time remains to complete other transactions, then the process returns to step 302. Similarly, if at step 308 the arbitration logic determines that there is no pending temperature calibration request, the arbitration logic operates in accordance with normal convention by executing the next highest priority transaction as shown in steps 320 and 322.

While the present invention shows temperature calibrations as being of relatively high priority, the present invention may also be implemented by awarding other transactions with a priority higher than temperature calibration operations. Thus, for example, precharge and RAS operations may be placed at a priority higher than temperature calibrations. In addition, the present invention envisions separating various portions of read transactions into precharge, activate and column operations. If desired, the read queue may be treated integrally, so that any portion of a read command executes as early as possible.

The present invention also may be used in computer systems that implement multiple memory channels. Thus, the program of FIG. 10 may be implemented on a channel-by-channel basis if desired, or may be implemented across all channels. Preferably, the program of FIG. 10 operates continuously once initialized, until the computer system is placed in a low power mode or turned off.

The foregoing discussion describes a situation that focuses on the execution of a calibration cycle, so that when a calibration cycle is run, non-read cycles are selected by the arbiter for execution during the required read idle time. It should be understood that the system may also be configured to fit calibration cycles into write cycles. Typically write operations are posted and held in the write queue until there are no read cycles to execute. When the memory controller begins executing write operations, the memory controller will burst multiple writes, even if a read request is received, to minimize the set-up times for read-write turnaround times on the memory bus. In addition, memory queues also may be designed to flush the write queue when the queue depth reaches some critical threshold. The present invention contemplates scheduling calibration cycles around the write bursts. Thus, when these write bursts are scheduled to start, a signal may be sent to the calibration logic to indicate that a write burst is to begin executing. The calibration then looks at the calibration timers to determine how long a period has elapsed since the last calibration cycle. If the amount of time that has expired is above a threshold value, the calibration logic issues a calibration request, that then can be paired and run with the write burst. Thus, even though a calibration cycle may not be required, the system uses the write burst as a convenient and efficient time to fit in a calibration cycle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:

a CPU;

system memory including one or more dynamic random access memory devices wherein said dynamic random access memory devices periodically require temperature calibration cycles;

a memory controller coupled to said CPU and to said system memory, said memory controller controlling accesses to main memory and controlling execution of said calibration cycles;

wherein said memory controller includes arbitration logic, a write queue, a read queue, a temperature calibration queue, and an operational queue; and wherein said arbitration logic is capable of prioritizing transactions pending in said queues so that transactions in the read queue have priority over transactions in the temperature calibration queue, and at least some of said transactions in the write queue and in the operational queue are scheduled to execute during idle periods in said temperature calibration cycle.

2. The system of claim 1, wherein said operational queue comprises one of a refresh queue, a precharge queue, or a temperature calibration queue cycle.

3. The system of claim 1, wherein said arbitration logic assigns a higher priority to transactions in said read queue than transactions in said temperature calibration queue.

4. The system as in claim 1, wherein said memory controller includes a timer that causes a temperature calibration operation to be posted in the temperature calibration queue, and wherein said temperature calibration operation is executed after all transactions posted in the read queue are executed.

5. A memory controller that controls access to memory comprising:

a read queue in which transactions seeking to read data from memory are queued;

a write queue in which transactions seeking to write data to memory are queued;

temperature calibration logic, including a timer, that initiates temperature calibration cycles to memory;

a temperature calibration queue in which temperature calibration cycles are queued;

arbitration logic that determines priority associated with each queue, wherein said arbitration logic causes all transactions pending in said read queue to execute prior to the temperature calibration cycle, and said arbitration logic causes said temperature calibration cycle to begin executing prior to transactions in the write queue; and wherein said arbitration logic schedules one or more transactions pending in the write queue to execute during idle periods in the temperature calibration cycle.

6. The memory controller as in claim 5, wherein said memory controller includes one or more of the following operational queues: a precharge queue, a refresh queue, or a current calibration queue; and wherein said arbitration logic causes transactions pending in said one or more operational queues to execute during the idle periods in the temperature calibration cycle.

7. The memory controller as in claim 6, wherein the memory comprises at least one Rambus DRAM device.

8. The memory controller of claim 7, wherein said at least one Rambus DRAM device resides on a memory channel that couples to said memory controller.

9. A computer system, comprising:

a processor;

system memory coupled to said processor;

means for controlling access to said system memory, said means for controlling including means for queuing read transactions to said system memory, means for queuing write transactions to said system memory, means for queuing calibration cycles to said system memory, and means for queuing operational cycles to system memory, and wherein said means for controlling further includes an arbiter that prioritizes transactions pending in each of said queue means so that transactions pending in said read transaction queue means execute first, and transactions pending in said calibration queue execute second.

10. A system as in claim 9, wherein transactions pending in said write transaction queue means and transactions pending in said operational queue means execute during idle periods in the calibration cycle.

11. A system as in claim 10, wherein said system memory comprises multiple channels of memory, and a separate means for controlling is associated with each channel of memory.

12. A method for controlling access to memory, comprising:

sorting memory transactions into a read queue, a write queue, a calibration queue, and an operational queue;

executing transactions pending in the read queue prior to executing other transactions;

executing any transaction pending in said calibration queue, prior to executing transactions pending in the write queue or the operational queue; and scheduling transactions pending in the write queue or the operational queue to execute during idle periods in the calibration cycle.

13. A method as in claim 12, wherein the operational queue comprises a refresh queue.

14. A method as in claim 12, wherein the operational queue comprises a precharge queue.

15. A method as in claim 12, wherein the calibration queue comprises a temperature calibration queue.

* * * * *